United States Patent
Prasad et al.

(10) Patent No.: US 8,917,648 B2
(45) Date of Patent: Dec. 23, 2014

(54) PRECODER DESIGN FOR PHYSICAL LAYER MULTICASTING

(71) Applicants: Narayan Prasad, Wyncote, PA (US); Hao Zhu, Wyncote, PA (US); Sampath Rangarajan, Bridgewater, NJ (US)

(72) Inventors: Narayan Prasad, Wyncote, PA (US); Hao Zhu, Wyncote, PA (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 167 days.

(21) Appl. No.: 13/621,293

(22) Filed: Sep. 17, 2012

(65) Prior Publication Data

US 2013/0170422 A1    Jul. 4, 2013

Related U.S. Application Data

(60) Provisional application No. 61/535,641, filed on Sep. 16, 2011.

(51) Int. Cl.
*H04W 4/06* (2009.01)

(52) U.S. Cl.
CPC ...................................... *H04W 4/06* (2013.01)

USPC ............................................. 370/312; 370/328

(58) Field of Classification Search
None
See application file for complete search history.

(56) References Cited

U.S. PATENT DOCUMENTS

| | | | | |
|---|---|---|---|---|
| 8,660,202 | B2* | 2/2014 | Jose et al. | 375/267 |
| 2010/0254295 | A1* | 10/2010 | Ahn et al. | 370/312 |
| 2010/0273492 | A1* | 10/2010 | Liu et al. | 455/446 |
| 2012/0155366 | A1* | 6/2012 | Zirwas et al. | 370/312 |
| 2014/0112234 | A1* | 4/2014 | Wei | 370/312 |

* cited by examiner

*Primary Examiner* — Brian D Nguyen
*Assistant Examiner* — Roberta A Shand
(74) *Attorney, Agent, or Firm* — Joseph Kolodka

(57) ABSTRACT

A method for a transmit precoder for multicast communication over a downlink in a wireless network, including: initializing a transmit precoder, a channel estimate for each user in the wireless network; updating for each user a receive filter and a slack matrix; updating the transmit precoder by solving a second order cone routine solvable in closed form; determining if a predetermined convergence is met; and outputting the updated transmit precoder responsive to the convergence criteria.

4 Claims, 5 Drawing Sheets

PRECODER DESIGN FOR PHYSICAL LAYER MULTICASTING

RELATED APPLICATION INFORMATION

This application claims priority to provisional application No. 61/535,636 filed Sep. 16, 2011, the contents thereof are incorporated herein by reference

BACKGROUND OF THE INVENTION

The present invention relates generally to wireless communications, and more particularly, to precoding for physical layer multicasting.

Next generation wireless networks will require a spectrally efficient physical layer multicasting scheme in order to cater to important emerging applications such as real-time video broadcast, wherein a common information needs to be simultaneously transmitted to multiple users. The design of spectrally efficient physical layer multicasting schemes via instantaneous rate maximization has consequently received significant recent attention.

Referring to the diagram of FIG. 1A, there is shown an exemplary multicast communication over a cellular downlink. Notice that a single source communicates with multiple receivers on the same channel. In particular, in multicasting the source is interested in conveying the same message to all the users. This can be done by sending (or transmitting) the message to one user at a time but this approach leads to significantly degraded throughput (or spectral efficiency). On the other hand, simultaneously sending the message to all users is spectrally efficient but there are some key challenges that need to be overcome before these spectral efficiency gains can realized: optimizing the signal attributes such that the transmitted signal is suitable for all users, conveying the attributes of the transmitted signal to the users when only limited signaling related information can be conveyed; complexity constraints at the transmitter and at the users which necessitate that the optimization of signal attributes can be done with a low complexity by the transmitter, and that each user can receive the transmitted signal reliably with a decoding complexity not exceeding its respective complexity constraint.

Others have proposed: 1) Sequential transmission of the common message wherein the common message is transmitted to one user at a time after optimizing the signal attributes considering only that intended user; 2) Simultaneous transmission of the common message after assuming each user has only one receive antenna, which in turn imposes a rank one constraint on the signal attributes; 3) Simultaneous transmission of the common message using a simple heuristic which can lead to sub-optimal performance.

Accordingly, there is a need for improved precoding for multicast communication over a cellular downlink.

BRIEF SUMMARY OF THE INVENTION

The present invention is directed to a method for a transmit precoder for multicast communication over a downlink in a wireless network, including: initializing a transmit precoder, a channel estimate for each user in the wireless network; updating for each user a receive filter and a slack matrix; updating the transmit precoder by solving a second order cone routine solvable in closed form; determining if a predetermined convergence is met; and outputting the updated transmit precoder responsive to the convergence criteria.

These and other advantages of the invention will be apparent to those of ordinary skill in the art by reference to the following detailed description and the accompanying drawings.

DETAILED DESCRIPTION

Figure 1A:
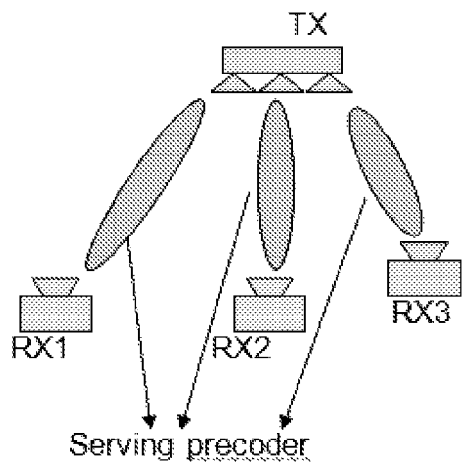
FIG. 1A depicts an exemplary cellular downlink configuration over which multicast communication in accordance with the invention is undertaken.

The present invention is directed to a method for precoding for physical layer multicasting. The inventive method allows simultaneous transmission of the common message and takes into account the general case where the transmitter and all users can have multiple antennas. The inventive method entails low complexity alternating optimization based methods as well as greedy routines to optimize the signal attributes, under the given complexity constraints. The inventive method also takes into account optimizing the signal attributes under two formulations: maximizing the minimum of the instantaneous user rates and minimizing the weighted sum of the user delays. The inventive method enables higher spectral efficiency, less complexity and faster operation.

The invention considers a wireless cellular downlink comprising of one transmitter (a.k.a. base-station) and K users. The invention focuses on multicast communications (a.k.a. multicasting) in which the same message must be conveyed to all the K users. In particular, the invention considers a multicasting scheme where the common message is simultaneously transmitted to all the users to achieve high spectral efficiency. However, to do so there is a need to optimize the signal attributes such that the transmitted signal is suitable for all the users.

In this invention, signal attributes is intended to mean the transmit precoding matrix (henceforth referred to as the precoder or the precoder matrix) which is used to ensure that the signal is transmitted along directions in a signal space that are suitable for all users. The goal is to optimize this precoder matrix.

The dimensions of the precoder matrix, denoted by W, is M×d where M is the number of transmit antennas and d is the rank or equivalently the number of symbols (or symbol/data streams) that are simultaneously transmitted. The choice of d is governed by the complexity and spectral efficiency (SE) tradeoff in that a larger d allows for a higher SE but also imposes a higher decoding complexity on the users. We assume that a value of d is specified as an input. In addition, the precoder matrix must also satisfy a power or norm constraint. In summary, the precoder matrix must satisfy rank and power constraints.

In addition to the rank and power constraints, there is an enforcement that the precoder must lie in a codebook. There are two relevant codebook scenarios that are considered, which are explained below.

Continuous codebook: Here the precoder W can be any arbitrary complex-valued matrix subject to norm (power) and dimensionality (rank) constraints. Note that the continuous codebook (which is denoted by $C_c$) is applicable in a scenario where pilots precoded by the chosen precoder W can be transmitted (such as in the networks conforming to the 3GPP LTE Release 10 and beyond) so that each user can directly estimate its precoded channel. Consequently, the choice of W need not be explicitly signaled to the users.

Discrete codebook: Such a codebook is motivated by a practical scenario where precoded pilots are not available, such as in the networks conforming to the 3GPP LTE Release 8 standard and where the signaling overhead (needed to indicate the choice of precoder to the users) is limited. In this case the BS must use a precoder that lies in a finite codebook of matrices. We adopt a simple concatenation based approach in which a selected higher rank precoder can be formed by concatenating precoders from a base codebook comprising of a finite number of matrix codewords. The base codebook is given as an input and is known in advance to all users and the transmitter (base station). We note that the concatenation-based approach has several advantages such as: it results in a smaller memory footprint, facilitates simpler search algorithms for determining a suitable precoder and it can also reduce the signaling burden compared to a finite albeit unstructured codebook.

The discrete codebook is denoted by $C_d$ and to describe its formation, we define a ground set $\epsilon$ of elements such that each element of $\epsilon$ represents a precoder from the base codebook along with a power level. Thus, each member W of the discrete codebook $C_d$ is associated with a subset of elements from $\epsilon$ with the understanding that the precoders corresponding to that subset are all concatenated (after scaling by the square-roots of their respective associated power levels) to form W.

We consider two choices for metrics or objective functions for our precoder optimization. They are (P1) the minimum of the instantaneous user rates and, (P2) the weighted sum of the delays of all users.

For the case of the (P1) metric, the optimization problem is that of maximizing the minimum instantaneous user rate subject to the rank and power constraints and the codebook constraint and is given by $$\max_{W \in C} \min_{k=1,\ldots,K} R_k(W) \quad (P1)$$

where C denotes the codebook and $R_k(W)$ denotes the rate achieved for the user k upon using precoder W.

For the case of the (P2) metric, the optimization problem is that of minimizing the weighted sum of the delays of all users subject to the rank and power constraints and the codebook constraint and is given by $$\min_{\{W^\tau \in C\}} \sum_{k=1}^{K} \mu_k D_k(\{W^\tau\}) \quad (P2)$$

where the weights $\{\mu_k\}_k^K=1$ determine the user priorities and the delay for the user k (in terms of number of scheduling intervals, with each such interval comprising of L slots) is given by $$D_k(\{W^\tau\}):=\min\{t \in \mathbb{Z}_+ : \Sigma_{\tau=1}^{Lt} R_k^\tau(W^\tau) \geq \theta\}$$

where $R_k^\tau(W^\tau)=\log |I+H_k^\tau W^\tau W^{\tau\dagger} H_k^{\tau\dagger}|$ denotes the rate that can be achieved for user k on slot r when precoder W is employed, $H_k^\tau$ denotes the channel seen by user k on slot r and $\theta$ denotes a threshold for reliable decoding.

Combining all the possibilities, in the invention we have considered four cases and have proposed algorithms for each one of them. These four cases are: 1) Problem P1 with continuous codebook; (2) Problem P1 with discrete codebook; (3) Problem P2 with continuous codebook; (4) Problem P2 with discrete codebook. Each proposed method has a low implementation complexity and it leads to a solution with a certain desirable property such as local optimality in the continuous codebook case or a worst-case approximation guarantee in the discrete codebook case.

Figure 1B:
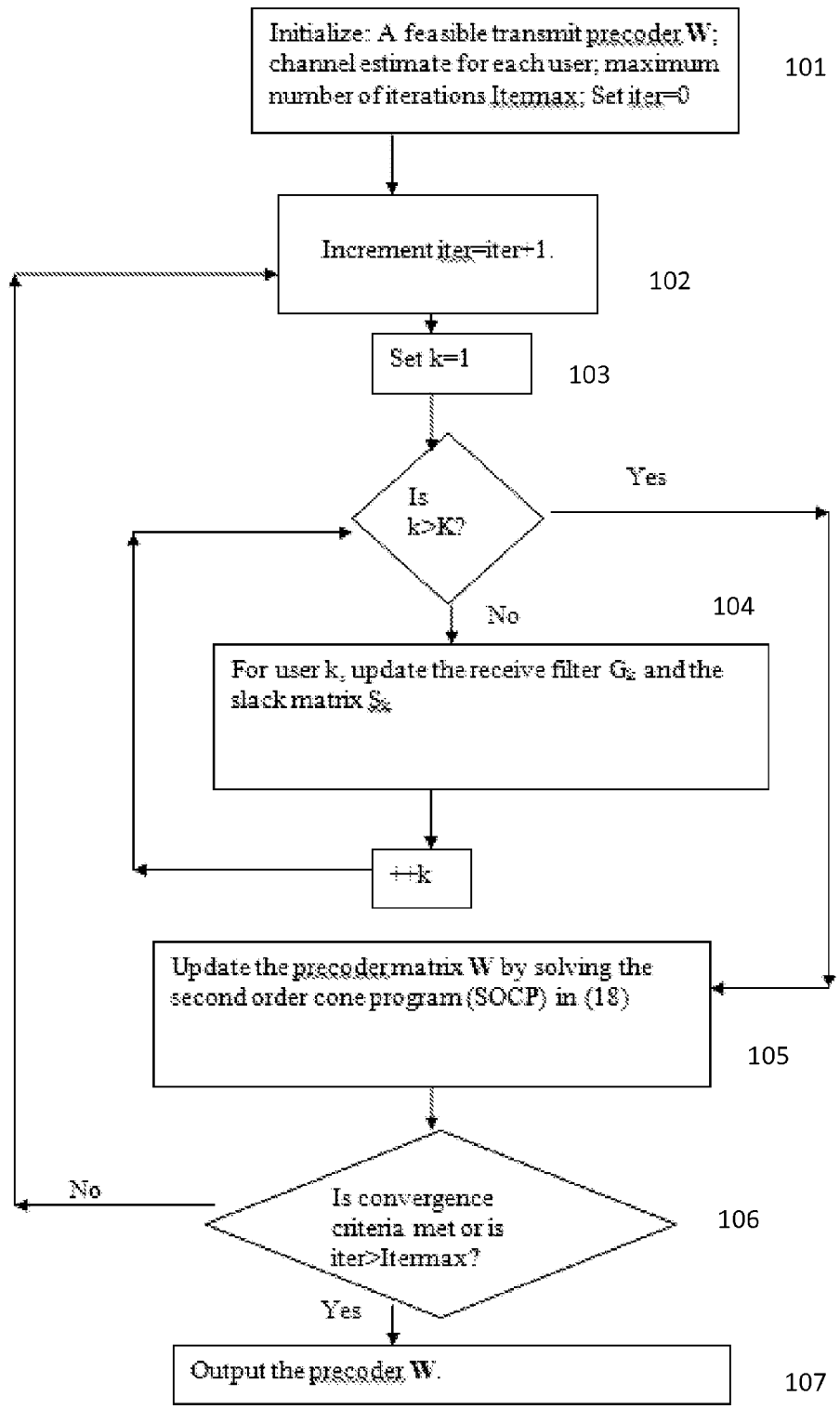
FIG. 1B is a flow diagram for precoding steps with minimum of instantaneous user rates for physical layer multicasting with a continuous codebook, in accordance with the invention.

Referring now to the flow diagram of FIG. 1B, the process shown is directed to address the problem P1 under the continuous codebook constraint. For a feasible transmit precoder W, a channel estimate for each user k, a maximum number of iterations is set 101. The iterations is initially set to 0 and then incremented 102, followed by 103 the number of users k being set to 1.

Note that in the process of FIG. 1B, the inventive method adopts an alternating optimization approach. The inventive method first obtains an equivalent formulation for (P1) by introducing more auxiliary variables, in particular a receive filter matrix $G_k$ and a slack matrix $S_k$ for each user k. Then, keeping the precoder matrix W fixed, for each user k the invention updates the receive filter as $$G_k \leftarrow (H_k W W^\dagger H_k^\dagger I_{N_k})^{-1} H_k W$$

and the slack matrix as $$S_k \leftarrow W^\dagger H_K^\dagger H_k W + I_d.$$

where $H_k$ denotes the channel seen by user k and $N_k$ denotes the number of receive antennas at user k and d denotes the upper bound on the number of symbols (in the rank constraint) 104.

Then, after updating all the receive filters and slack matrices, we keep them fixed and update the transmit precoder W by solving the SOCP in (18) which is given by $$\max_{\|W\|_F^2 \leq P} \beta \quad (18a)$$

$$s.to \; c_k - \beta \geq \|B_k^\dagger(G_k^\dagger H_k W - I_d)\|_F^2, \forall k \quad (18b)$$

where the optimization is over W and $\beta$. The constant $c_k:=\log |S_k+d-\|G_k B_k\|_F^2$ and $S_k=B_k B_k^\dagger$. denotes the Cholesky factorization and P denotes the power budget (in the power constraint) 105. The method then checks if the convergence criteria is met 106 and the precoder W is output 107.

The convergence 106 of the process in FIG. 1B in terms of the objective value is guaranteed due to the cyclic ascent nature of the algorithm that ensures a monotonically non-decreasing objective across iterations. However, proving a convergence result for the sequence of iterates is more involved and such a result is proved in the invention.

Figure 2A:
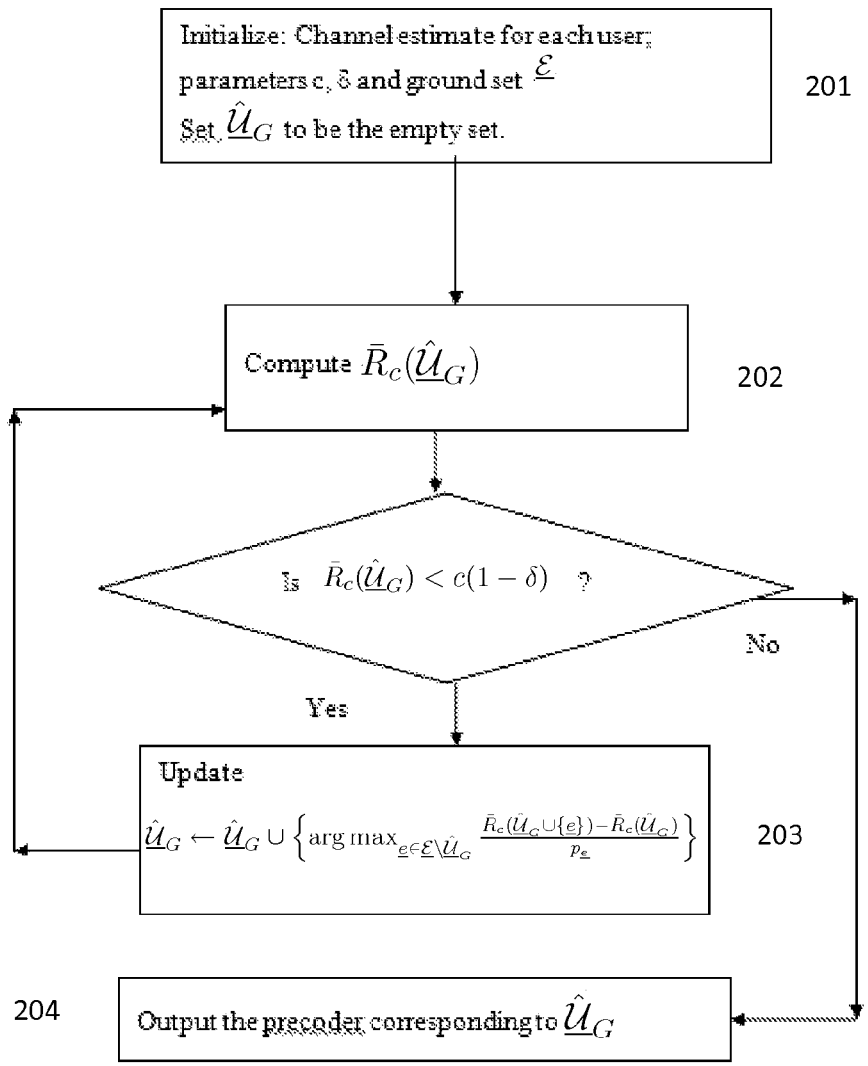
FIGS. 2A and 3A are flow diagrams for precoding steps with minimum of instantaneous user rates for physical layer multicasting with a discrete codebook, in accordance with the invention.
Figure 3A:
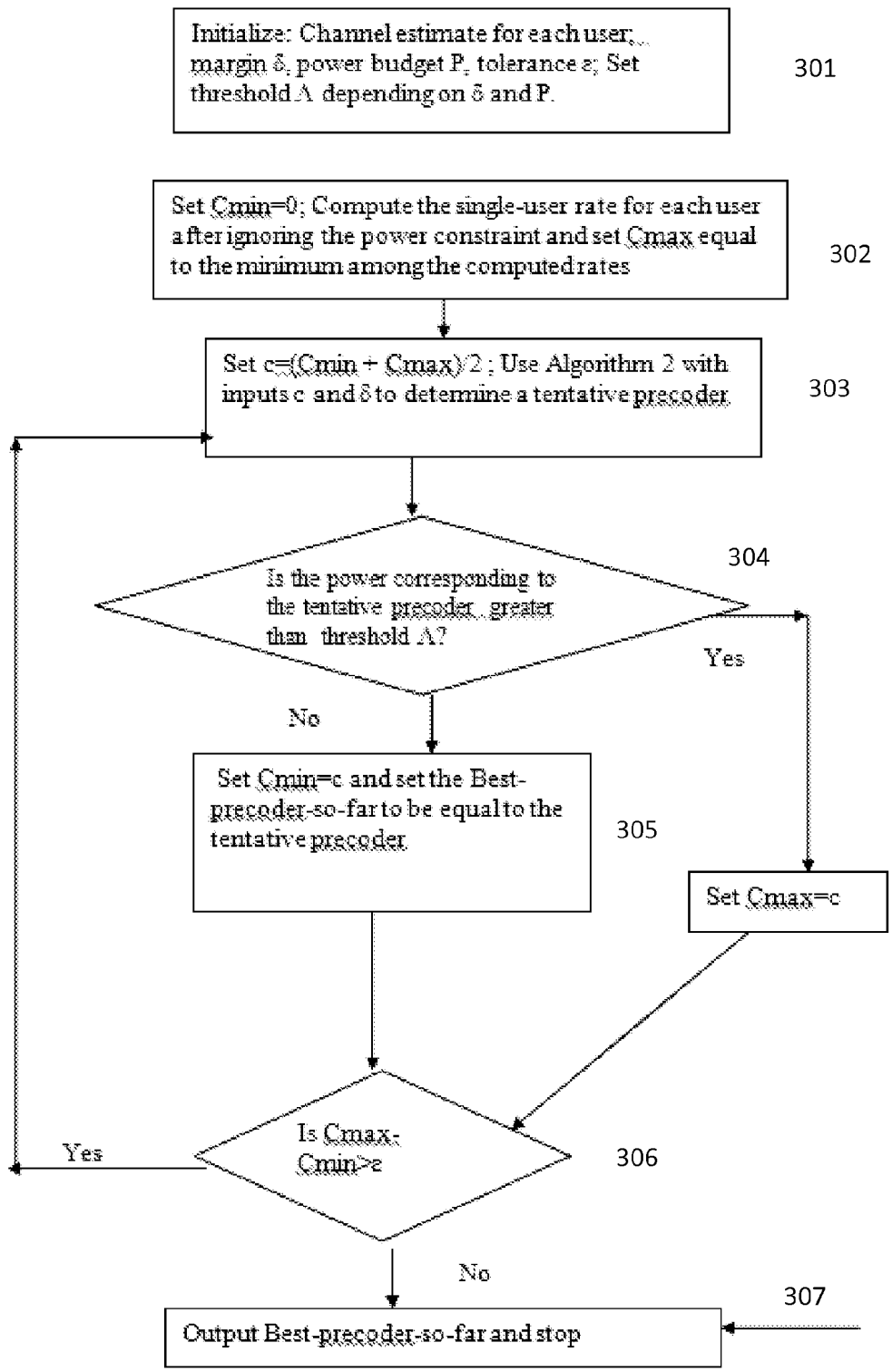

The flow diagrams of FIGS. 2A and 3A are directed to the problem P1 under the discrete codebook constraint. From a step-by-step perspective, channel estimate for each user, margin, power budget, tolerance and a threshold are initialized or set 301. Then the method computes the single-user rate for each user after ignoring the power constraint and sets $C_{max}$ equal to the minimum among computed rates 302. The process of FIG. 2A is called in to determine a tentative precoder 301. There is a check if the power corresponding to the tentative precoder s greater than a specific threshold 304. If not, the Best-precoder-so-far is set to be equal to the tentative precoder 305. After a $C_{max}$ value check 306 and possible return to step 303, the process outputs the best-precoder-so-far 307. The process of FIG. 2A, called upon by the process of FIG. 3A in step 303, initializes channel estimate for each user and certain parameters 201.

As mentioned earlier each precoder W in the discrete codebook $C_d$ is associated with a valid subset of elements from $\epsilon$. Thus the problem (P1) in the discrete codebook case can also be expressed as $$\max_{\mathcal{U} \subseteq \mathcal{E}} \min_{k=1,\ldots,K} R_k(\mathcal{U}) \text{ s.to } r_{\mathcal{U}} \leq d, \, p_{\mathcal{U}} \leq P$$

where $$r_{\mathcal{U}} = \sum_{e \in \mathcal{U}} r_e;$$

$$p_{\mathcal{U}} = \sum_{e \in \mathcal{U}} p_e$$

denote the total rank and power corresponding to the subset $u \subseteq \epsilon$ and $r_e$, $p_e$ denote the rank and power associated with element e in $\epsilon$. The precoder W associated with u is formed via concatenation as $W := [\{\sqrt{p_e} W_e\}_{e \in u}]$.

For simplicity we ignore the rank constraints in describing the process of FIG. 3A, i.e., we consider the problem $$\max_{\mathcal{U} \subseteq \mathcal{E}} \min_{k=1,\ldots,K} R_k(\mathcal{U}) \text{ s.to } p_{\mathcal{U}} \leq P.$$

We note that the threshold $\Lambda$ in the process of FIG. 3A can be set depending on $\delta$ and P for example $\Lambda = P(1 + \ln(1/\delta))$. Notice that the process of FIG. 3A invokes the process of FIG. 2A as a module. Also, the process of FIG. 2A involves computing a set function value $\bar{R}_c(\hat{u}_G)$ 202, where the set function is defined for a given c as $\bar{R}_c(U) := (1/K) \Sigma_{k=1}^K R_{k,c}(U)$ where $R_{k,c}(U) := \min\{R_k(U), c\}$ for all $U \subseteq \epsilon$. Step 203 updates $\hat{U}_G$. Notice also that the process of FIG. 2A adds elements to the set $\hat{U}_G$ in a greedy fashion 204.

Figure 4A:
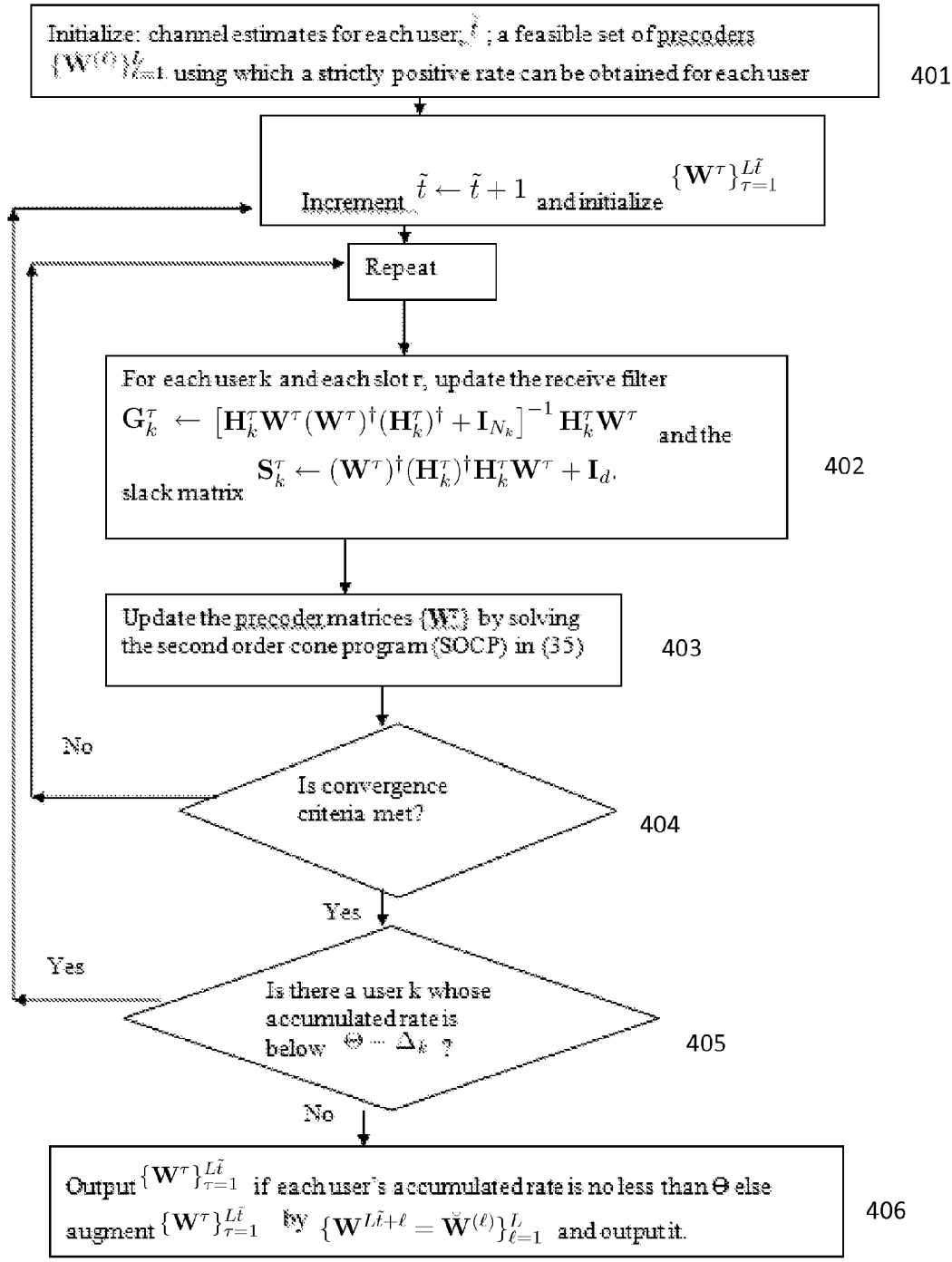
FIG. 4A is a flow diagram for precoding steps with a weighted sum of the delays of all users for physical layer multicasting with a continuous codebook, in accordance with the invention.

The flow diagram of FIG. 4A is directed to the problem P2 under the continuous codebook constraint.

It is assumed that a set of valid precoders $\check{W}^{(l)}{}_{l=1}^L$ is given as an input 401 using which a positive rate vector $\Delta \succ 0$ can be achieved on any interval. Note that $\Delta \succ 0$ indicates that its $k^{th}$ component $\Delta^k$, which is the rate that can be achieved for user k, is strictly positive and this holds true for all k. Also, given as an input is an initial value for $\tilde{t}$ which denotes the number of scheduling or transmission intervals (each containing L slots).

Note that in process of FIG. 4A, we sequentially consider values for $\tilde{t}$. For each choice of a value for $\tilde{t}$, we adopt an alternating optimization approach to optimize the L$\tilde{t}$ transmit precoders. We first initialize with a feasible choice of L$\tilde{t}$ transmit precoders 401. Then, keeping the transmit precoders fixed we update a receive filter and a slack matrix for each user and each slot 402. Then, keeping all receive filters and slack matrices fixed we update the L$\tilde{t}$ transmit precoders by solving the SOCP in (35) 403 which is given by $$\max_{\{W^\tau \in \mathbb{C}^{M \times d} : \|W^\tau\|_F^2 \leq P\}, \{\alpha_k^t, \beta_k^\tau\}} \sum_{k=1}^K \sum_{t=1}^{\tilde{t}} \mu_k \alpha_k^t \quad (35a)$$

$$\text{s.to } \Theta \alpha_k^t \leq \sum_{\tau=1}^{Lt} \{-\|G_k^\tau B_k^\tau\|_F^2 - \beta_k^\tau + \log|S_k^\tau| + d\} \quad (35b)$$

$$\beta_k^\tau \geq \|(B_k^\tau)^\dagger [(G_k^\tau)^\dagger H_k^\tau W^\tau - I_d]\|_F^2, \, \forall \, k, \tau \quad (35c)$$

$$\alpha_k^t \leq 1, \, \forall \, k, t. \quad (35d)$$

where $S_k^\tau = B_k^\tau (B_k^\tau)^\dagger$ denotes the cholesky decomposition of $S_k^\tau$ for each user and each slot. Then, convergence is checked 404, and user k accumulated rates below a threshold is checked 405, and a set of precoders $\{W^\tau\}_{\tau=1}^{L\tilde{t}}$ is output 406.

Figure 5A:
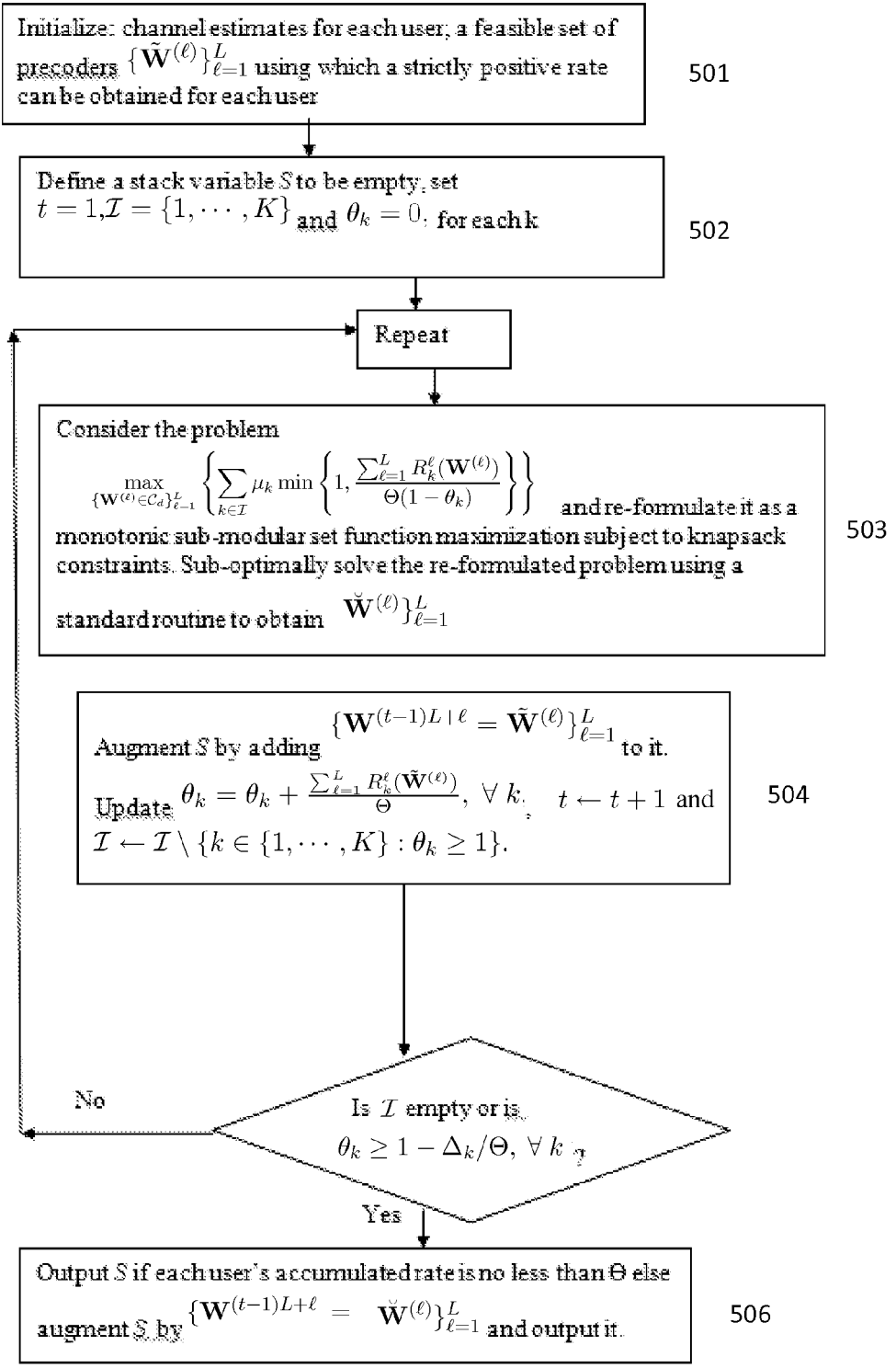
FIG. 5A is a flow diagram for precoding steps with a weighted sum of the delays of all users for physical layer multicasting with a discrete codebook, in accordance with the invention.

The diagram of FIG. 5A is directed to the problem P2 under the discrete codebook constraint.

It is again assumed that a set of valid precoders $\{\check{W}^{(l)}\}_{l=1}^L$ (each lying now in the discrete codebook) is given as an input 501 using which a positive rate vector $\Delta \succ 0$ can be achieved on any interval. A stack variable S is defined to be empty 502. Notice, that for the process of FIG. 5A we consider the optimization problem $$\max_{\{W^{(l)} \in C_d\}_{l=1}^L} \left\{ \sum_{k \in I} \mu_k \min\left\{1, \frac{\sum_{l=1}^L R_k^l(W^{(l)})}{\Theta(1-\theta_k)}\right\}\right\},$$

and reformulate it as a monotonic sub-modular set function maximization subject to knapsack constraints 503. The stack variable is augmented 504. A stack is output if each user's accumulated rate meets a specified condition.

In the invention we show that this problem can be re-formulated as a monotonic sub-modular set function maximization subject to knapsack constraints. As a result, we can sub-optimally solve the re-formulated problem using a standard routines available in the prior-art to obtain $\check{W}^{(l)}{}_{l=1}^L$.

We emphasize that this re-formulation is necessary in order to be able to use the standard routines.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in Appendix A to the application. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method for operating a transmit precoder for multicast communication over a downlink in a wireless network, comprising:
   performing a channel estimate for each user in said wireless network;
   updating for each said user a receive filter and a slack matrix;
   updating said transmit precoder by solving a second order cone routine solvable in closed form as:

$$\max_{\|W\|_F^2 \leq P} \beta$$

$$s.to \ c_k - \beta \geq \left\| B_k^\dagger (G_k^\dagger H_k W - I_d) \right\|_F^2, \ \forall k \qquad 5$$

where the optimization is over W and $\beta$, the constant $c_k := \log |S_k| + d - \|G_k B_k\|_F^2$, $S_k = B_k B_k^\dagger$ denotes a Cholesky factorization and P denotes the power budget in a power constraint, $G_k$ denotes said receive filter per user k, $S_k$ denotes said slack matrix per user k, $\beta$ becomes equal to a minimum of achievable costs among all K users, and $H_k$ denotes the channel seen by user k:

determining if a predetermined convergence is met; and outputting the transmit precoder responsive to a convergence criteria.

2. The method of claim 1, wherein said predetermined convergence ensures a monotonically non-decreasing objective across iterations.

3. The method of claim 1, wherein said receive filter comprises $G_k \leftarrow (H_k W W^{554} H_k^\dagger + I_{N_k})^{-1} H_k W$ where W denotes dimensions of the transmit precoder, $H_k$ denotes the channel seen by user k, I denotes interval, and $N_k$ denotes the number of receive antennas at user k and d denotes the upper bound on the number of symbols (in the rank constraint).

4. The method of claim 1, wherein said slack matrix comprises $S_k \leftarrow W^\dagger H_k^\dagger H_k W + I_d$, where W denotes the transmit precoder, $H_k$ the channel seen by user k, I denotes and $N_k$ denotes the number of receive antennas at user k and d denotes the upper bound on the number of symbols in the rank constraint.

\* \* \* \* \*